United States Patent [19]

Reed

[11] Patent Number: 5,445,023
[45] Date of Patent: Aug. 29, 1995

[54] SAFE, ACCURATE AND FAST MEASURING DEVICE

[76] Inventor: Robert R. Reed, 312 E. Faris Rd., Greenville, S.C. 29605

[21] Appl. No.: 228,227

[22] Filed: Apr. 15, 1994

[51] Int. Cl.⁶ .......................................... G01F 19/00
[52] U.S. Cl. ...................................... 73/427; 73/426
[58] Field of Search ................ 73/426, 427, 428, 429; 30/324, 326, 327

[56] References Cited

U.S. PATENT DOCUMENTS

| | | | |
|---|---|---|---|
| 68,913 | 9/1867 | Sumner | 73/426 |
| 898,701 | 9/1908 | Tate | 73/426 |
| 2,018,538 | 10/1935 | Webb | 73/167 |
| 2,592,192 | 4/1952 | Sanford | 30/327 |
| 2,654,252 | 10/1952 | Davis | 73/426 |
| 3,527,270 | 9/1970 | Weil | 141/284 |
| 3,924,472 | 12/1975 | Harris | 73/426 |
| 4,033,190 | 7/1977 | Hudspeth | 73/426 |
| 4,131,016 | 12/1978 | Layton | 73/215 |
| 4,283,951 | 8/1981 | Varpio | 73/426 |
| 4,467,645 | 8/1984 | Murphree | 73/215 |

FOREIGN PATENT DOCUMENTS

| | | | |
|---|---|---|---|
| 1546967 | 10/1968 | France | 73/426 |
| 0000535 | 2/1872 | United Kingdom | 73/426 |
| 0251926 | 5/1926 | United Kingdom | 73/426 |

*Primary Examiner*—William A. Cuchlinski, Jr.
*Assistant Examiner*—Willie Morris Worth
*Attorney, Agent, or Firm*—Robert R. Reed

[57] ABSTRACT

A measuring device consisting of a container or vessel is disclosed in this invention to provide a safe, accurate and fast means to obtain a desired quantity of a fluent material. The fluent material can be any liquid or granular material that has a relatively flat top surface. The container has a first volumetric portion that contains an exact volume when filled to the level of an overflow weir. A small overflow volume is allowed to pass over the weir into a second volumetric portion of the container. A diaphragm separates the two volumetric portions and is positioned within the container to allow the exact volume to be discharged without discharging the overflow volume. The overflow volume is safely returned to a bulk source container to conserve the fluent material. Only limited dexterity is required to quickly obtain an exact volume; as a safety lip is provided above the top surface of the fluent material which is limited by the weir height above a base of the container. The container is especially useful when toxic or hazardous fluent materials are being dispensed as in a laboratory or manufacturing process. The container of this invention also provides a fast and accurate kitchen measuring device, and multiple measurements can be made using a single container. One embodiment of this invention is disclosed as a spoon for safely obtaining an accurate measure of a fluent material, such as a cooking ingredient or medicine. Another embodiment of this invention allows for a removable portion to make the container system capable of measuring and dispensing different exact volumes.

9 Claims, 5 Drawing Sheets

SAFE, ACCURATE AND FAST MEASURING DEVICE

BACKGROUND OF THE INVENTION

1. Technical Field

The present invention relates to the devices used to measure and dispense a fluent material, and more particularly to an accurate measure that can be achieved quickly and safely.

2. Description of the Art

The use of conventional measurement containers or vessels often results in inaccuracies due to movement of the container and the lack of human dexterity. Containers having a scale marked on their sides rely on a line of sight and the alignment of this line of sight with the top surface of the material being measured. Safety and waste is a problem for containers which must be filled to their top edge. Some laboratory chemicals are very toxic and spillage is also very costly. Speed in accurately obtaining a precise volume of a fluent material is difficult to achieve. Generally speaking, the greater the desired accuracy the longer it takes to achieve it.

A critical and essential factor in the precise measurement of a fluent material is the ability to control the level of the top free surface of the material. Two patents that provide a means to control the surface level are U.S. Pat. Nos. 3,924,472 and 4,283,951. These patents control the top surface of a liquid and a granular material respectively.

The device of U.S. Pat. No. 3,924,472 has a fastening means to attach the container on a wall with a mounting bracket such that the errors in the line of site to the graduated scale are reduced to provide a more accurate measurement. This patent describes a solution to the problem where spillage of the ingredients occurs on numerous occasions as a result of improper holding or movement of the measuring device.

The top surface of a granular material in the dispensing apparatus of U.S. Pat. No. 4,283,951 is controlled to also affect accurate measuring and dispensing of a precise volume. A spring loaded leveler member moves over the top surface to fill voids and remove extra material to achieve a smooth flat top surface of the material. Any excess material is removed in a manner such that it does not remain on or in the apparatus.

Another desirable feature in the precise measurement of a fluent material is the control or elimination of spillage. This problem was discussed in U.S. Pat. No. 3,924,472 as described above and is further disclosed in U.S. Pat. Nos. 2,592,192 and 3,527,270. The patent of U.S. Pat. No. 2,592,192 is for a spoon to measure and administer prescribed doses and the liquid measurer of U.S. Pat. No. 3,527,270 is a cup that has a dish and a saucer to safely receive the contents of the cup.

The spoon of U.S. Pat. No. 2,592,192 is designed to teach a child to use it without spilling the contents. A partial cover has the contour of the bowl of the spoon and forms a cup. Graduations on the cup denote volumetric measures to facilitate correct measurement of liquids. The uncovered part of the bowl of the spoon forms a scoop readily accessible to the user's mouth.

The tipping cup of U.S. Pat. No. 3,527,270 achieves control of spillage in a different means. When the cup becomes full it looses it s balance and empties. Safety is provided by a mounting dish having an opening in the bottom. The liquid passes through the opening and is safely contained in the saucer below the dish. The cup has a brim portion that is lowered below the level of the liquid when the cup is tipped.

A device well known for controlling the elevation of a flowing liquid is the weir. The weir of U.S. Pat. No. 4,467,645 is used to control and measure the amount of water flowing in an open channel by limiting the weir crest across the top of the weir. The weir can also be a notch. The weir concept was also used to control and measure flow rate in U.S. Pat. Nos. 2,018,538 and 4,131,016.

U.S. Pat. No. 2,018,538 discloses an orifice of given diameter for controlling a flow rate into a tank that overflows to maintain a constant level and pressure in the tank. The top edge of the tank operates as a weir having a weir crest during liquid flow. In U.S. Pat. No. 4,131,016, a tubular collection container with an opening at it's upper end is spaced above a lower receptacle wall. The height of the upper end above the lower wall provides a discrete indication of the discharge peak flow rate measured by the device.

A precision measuring device or vessel for accurately measuring large volumes of liquid is disclosed in U.S. Pat. No. 4,033,190. A predetermined overflow level is defined by the position of a tube in the side of the vessel connected through a hole. The tube is connected to an overflow saver vessel for catching and saving any liquid above the desired liquid level. This overflow liquid can be discharged back into the measuring vessel through a second tubing by opening a valve. The primary vessel is emptied through a bottom valve or dumping by rotating about pivot pins. If the primary vessel is dumped by rotation, a valve is necessary in the tube going to the saver vessel, and the top of the saver vessel must be closed.

A feature of any container or vessel to be able to measure multiple volumes of a fluent material is functionally desirable. The spoons of U.S. Pat. No. 2,654,252 are capable of multiple volumes being measured by a single device. Four volumetric portions are formed into a single device. The concave spherical surfaces are capable of measuring a separate volume by filling each to their respective top edge or rim.

The need remains to achieve the quality measurement of large and small volumes of various fluent materials speedily and quickly with a degree of accuracy and safety not now achieved in the industry. This is particularly true for elimination of spillage or wastage to control possible contamination or pollution and reduce the cost of expensive fluent materials. The ability to obtain multiple exactly measured volumes in a single container or vessel also remains to be functionally very desirable. The need to be able to quickly and safely discharge the measured volume is equally important and unfulfilled.

SUMMARY OF THE INVENTION

One object of the invention is to provide a measuring container that can be filled rapidly so that an exact volume of a fluent material can be quickly obtained in a first volumetric portion and discharged. In particular, it should not be necessary to continually monitor the level of the material in the container as it approaches the desired volume.

Another object of the invention is to provide a container that can quickly, but safely, measure the desired volume of a fluent material without the danger of spillage. In particular, a safety lip portion is provided so that the potential for spillage of hazardous or valuable materials can be greatly reduced.

A further object of this invention is to provide a means to conserve the quantity of a fluent material while being dispensed. This is achieved by trapping an overflow volume in a second volumetric portion which remains in the container during a discharge of the exact volume in the first volumetric portion and is easily returned to a bulk container after the discharge.

The essential structural components of the measuring device or container include at least two volumetric portions, at least one baffle portion having an overflow weir, a base portion and a safety lip. Essential methods for dispensing an exact volume include the steps of filling a first volumetric portion, overflowing the weir, lifting and rotating the container in a first direction to discharge the exact volume without discharging an overflow volume.

The invention is a single container for safely measuring at least one exact volume of a fluent material. The container has at least one first volumetric portion in which each respective first volumetric portion can receive and contain up to an exact predetermined volume of the material. A base portion of the container is supported approximately horizontally such that the exact predetermined volume is obtained when said first volumetric portion is filled with the material. The container has at least one overflow weir to limit the elevation of a surface of the material to achieve a respective exact volume of the material. A safety lip of the container extends above the elevation of both the respective surface and weir to contain the material within said container.

A second volumetric portion coexists with each first volumetric portion in the container. The second volumetric portion receives and contains any overflow volume from the respective weir when a respective first volumetric portion has been filled. The respective exact volume of the fluent material can be discharged from the container by lifting and rotating the container in a first direction by hand or by the apparatus. The apparatus may be any appropriate device consistent with the container's size, weight, and shape. While the respective exact volume of the material is being discharged from the respective first volumetric portion, the respective overflow volume of the material is maintained within the respective second volumetric portion.

The overflow volume from filling the first volumetric portion is normally much less than the capacity of the second volumetric portion. The overflow volume can be discharged from the second volumetric portion by rotating the container in a second direction different than the first direction of rotation. The first and second volumetric portions are separated by a diaphragm. The diaphragm contains the overflow weir along it's top edge when the container is supported by the horizontal surface.

In a further embodiment of the invention, a method for safely and quickly dispensing an exact volume of a fluent material is achieved. In a first step, the first volumetric portion of a container is filled (with the material) when a base portion of the container is supported approximately horizontally. The second step is to continue filling the first volumetric portion so that a top surface of the material is approximately at a predetermined elevation of a weir. In a further step, the material is made to overflow the weir such that a relatively small overflow volume passes into a second volumetric portion of the container. The first volumetric portion now contains the exact volume of said material and the top surface is at an elevation below a top edge of a safety lip. The next step is to lift and rotate the container in a first direction to discharge the exact volume. In the final step, continue to rotate the container in the first direction to a position where the exact volume will be totally discharged, but the overflow volume will safely remain within the second volumetric portion of the container. A further step is to rotate the container in a second direction different than the first rotational direction to discharge the overflow volume from the second volumetric portion of the container.

In yet another embodiment of this invention a removable portion having a cylindrical shape is positioned within the container to provide and contain the second volumetric portion and to include the weir. The container has a base collar to receive and hold the removable portion and position the weir at a predetermined height above the base of the container. The height provides the first volumetric portion and the safety lip above the top surface of the exact volume.

DESCRIPTION OF THE PREFERRED EMBODIMENTS

Figure 1:
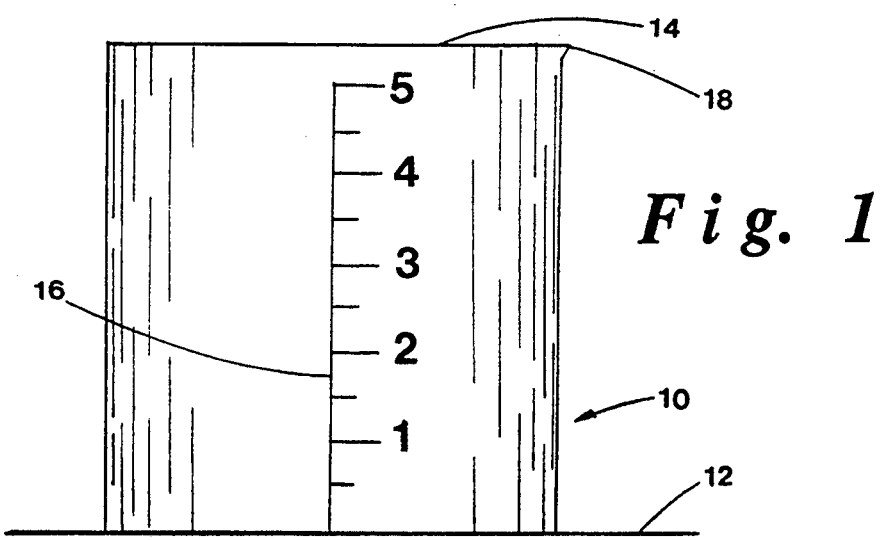
FIG. 1 is an elevation view of a container or vessel to measure and dispense of the prior art.

Containers or vessels for measuring and dispensing a fluent material are common in the art. One such container 10 is shown in FIG. 1. This container has sides and a bottom to contain the fluent material as it is supported on a surface 12. The top 14 of the container is open to accept the fluent material to be measured. A scale 16 is marked on the container to provide a means for obtaining the correct desired measure when surface 12 is approximately horizontal. The scale 16 is marked on the inside surface of the container which is of an opaque material or on the exterior of a container 10 made of a transparent material, as illustrated. A desired measure of volume is obtained by visually observing the top surface of the fluent material in relation to the scale 16 on the container 10. This may require a sight plane which is also approximately horizontal. The fluent material is discharged from the container 10 by lifting and rotating the container such that the material flows from a discharge point 18. Continued rotation is necessary until the material is completely discharged from the container to obtain the desired volume.

The container 10 of FIG. 1 can measure a number of different desired volumes with the use of the scale 16. However, many such containers have no scale and are filled to the top edge of the container which has a known contained volume and no safety lip.

For the purpose of this discussion a fluent material is a material capable of flowing under the influence of gravity or by a movement or vibration. The desired result is to be able to achieve a stable top surface which can become substantially horizontal. For example, a liquid or a fine powdered material are nominally fluent materials. A liquid has a surface tension which produces a curved surface at the boundary with the container. For some fluent materials the surface will curve upward at the boundary (i.e. water) and for other fluent materials it will curve downward at the boundary (i.e. mercury). Regardless, the accuracy of aligning the top surface with a scale 16 by visual means is only a partially successful means to achieve an accurate measure of a preferred volume, and depends on the ability of the individual making the measurement.

Figure 2A:
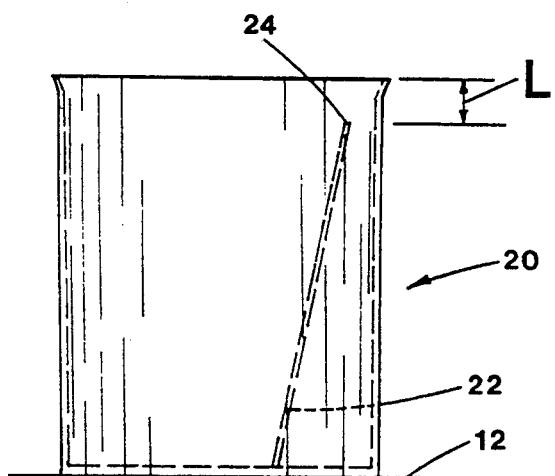
FIG. 2A is an elevation view of an embodiment of the container for safely measuring and dispensing an exact volume of a fluent material as per this invention.
Figure 2B:
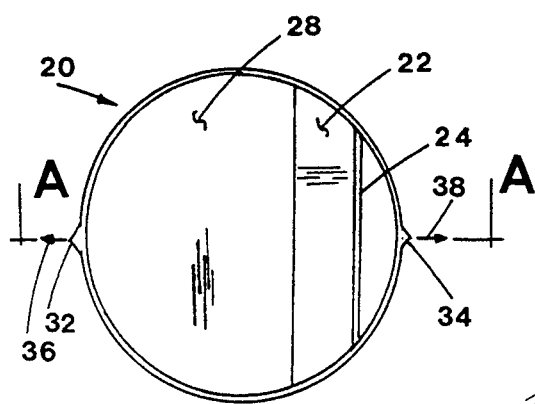
FIG. 2B is a top view of the container of FIG. 2A.
Figure 2C:
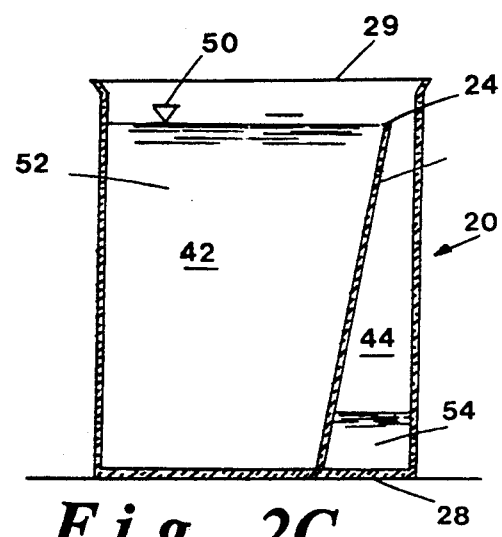
FIG. 2C is a sectional elevation view of the container of FIG. 2A, cut along line A—A shown in FIG. 2B.

A single container or vessel to obtain a very accurate measure of a preferred volume is illustrated in FIGS. 2A–2C. The container 20 has a base 28 supported on a surface 12 which is approximately horizontal. The container has a first volumetric portion 42 which will contain an exact predetermined volume 52 when completely filled. An exact volume as defined herein refers to precise calculations of the volume of the fluent material taking into account the level of the top surface 50 with the full influence of surface tension, temperature, wetting of the container surfaces, rheological properties of the material and so on. The level of the top surface 50 is controlled by an overflow weir 24 at the top edge of a diaphragm 22. When the top surface reaches the approximate level of the weir 24, a small overflow volume 54 of the fluent material is allowed to overflow the weir 24 into the second volumetric portion 44. The first and second volumetric portions are separated by the single flat, segmented or curved diaphragm 22. The second volumetric portion 44 is much larger than any expected overflow volume 54. The exact volume is maintained partially by a safety lip 26 extending above the weir 24 and, therefore, the top surface 50 of the exact volume 52. The safety lip 26 will essentially provide a safety feature so the top surface 50 will not reach the top edge 29 of the container, even during lack of care when filling the container. The safety volume 46 is contained by the safety lip height L.

Figure 2D:
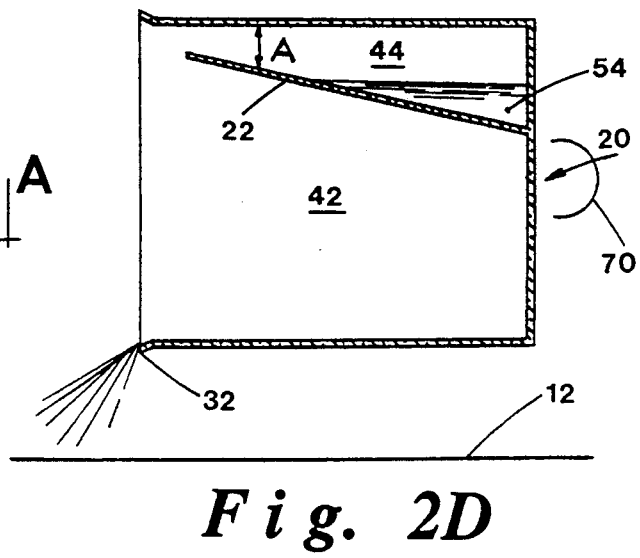
FIG. 2D is the sectional view of the container of FIG. 2 being rotated to discharge the exact volume while containing an overflow volume.

The relative size of the first volumetric portion 42 should be much larger than the second volumetric portion 44. However, there is no required relationship between the respective volumetric portions within the scope of this invention. The second volumetric portion 44 should be only large enough to provide a secondary side volume below the weir that contains the overflow volume 54 when the exact volume 52 is being discharged, as illustrated in FIG. 2D. The ability to stop filling the first volumetric portion 42 after only a small overflow volume passes over the weir depends on the dexterity of the person obtaining the exact volume measurement. It is observed that with only limited experience in obtaining exact volume of a liquid it is possible to discharge only a very small overflow volume. Visual as well as audio signals aid one in obtaining only small overflow volumes. A preferred ratio of the maximum volume within the second volumetric portion 44 to a respective exact volume 52 within the first volumetric portions 42 is less than 0.20.

The exact volume having been measured can now be discharged from the container for use as desired. Consider the container positioned as illustrated in FIG. 2C on the surface 12. A lifting and rotating of the container should occur simultaneously. A slight initial rotation counter-clockwise, as viewed in FIG. 2C, will keep any additional volume from being discharged over the weir. Continued rotation with lifting will discharge the exact volume, as illustrated in FIG. 2D. Care should be taken so that the rotation, indicated by the curved arrow 70, will not discharge the overflow volume 54 during the discharging of the exact volume 52. This is achieved without the addition of a cover, for example, or without closing a valve. The geometric configuration of the container and it's respective volumetric portions 42, 44 separated by the diaphragm 22 permits one to discharge only the exact volume 52.

After discharging the exact volume 52 from the container 20, the overflow volume 54 can be returned to a bulk fluent material source vessel or discarded. This is possible by rotating the container a direction opposite that shown by arrow 70 in FIG. 2D. A clockwise rotation of 180 degrees from that shown will discharge the overflow volume 54. Alternately, it is not necessary to discharge the overflow volume if multiple exact volumes are being measured and only a very small overflow volume is obtained with each exact volume measure. A number of exact volumes can be obtained before it is necessary to discharge the respective overflow volumes. The amount of overflow volume capable of being retained can be changed by adjusting the angle A of the diaphragm with respect to the side of the container and by adjusting the shape of the diaphragm 22. With the flat diaphragm as illustrated in FIG. 2D, the larger the angle A the more volume can be safely retained during discharge of the exact volume 52. The shape of the diaphragm 22 can also change, as illustrated by the dashed line.

Figure 3A:
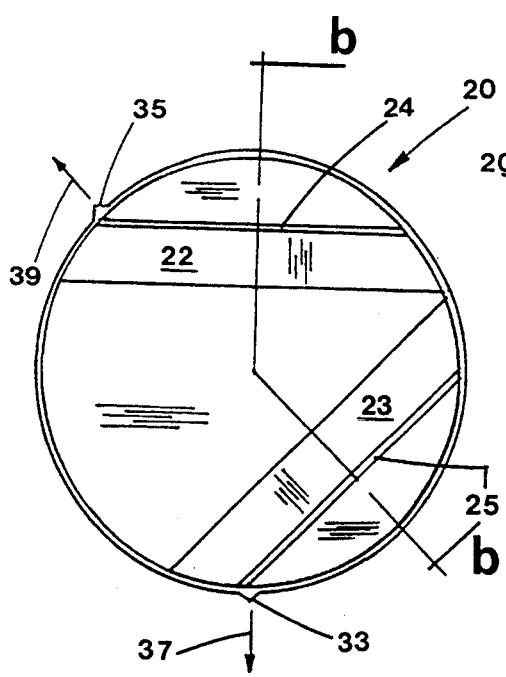
FIG. 3A is a top view of another embodiment of this container invention showing two first and second volumetric portions and two diaphragms.
Figure 3B:
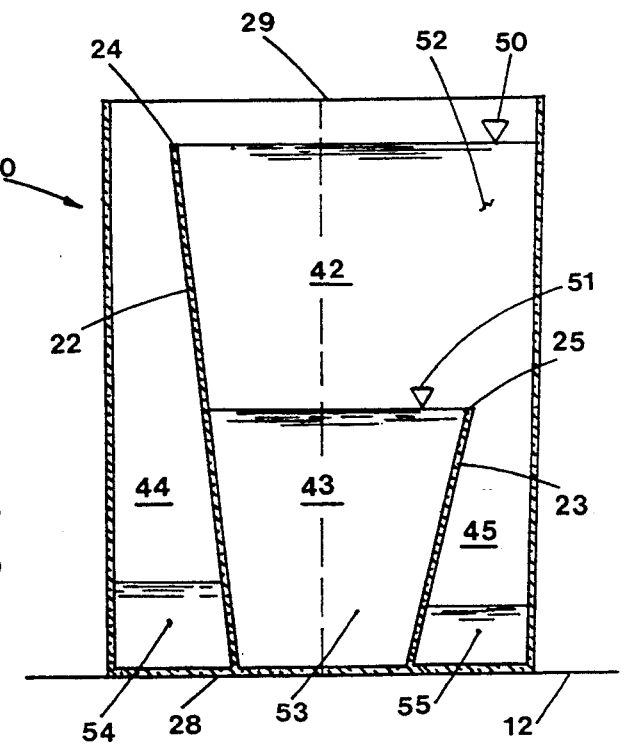
FIG. 3B is a sectional elevation view of the container of FIG. 3A cut along the broken line B—B.

A second embodiment of this invention is illustrated in FIGS. 3A & 3B. The single container or vessel of this embodiment can be used to obtain two different exact volumes 52, 53 of a fluent material. The smaller exact volume 53 contained in volumetric portion 43 has a first top surface 51 controlled by the first weir 25 at the top of the first diaphragm 23. This smaller exact volume 53 is discharged by lifting the container 20 above the horizontal surface 12 and rotating it such that a first point of discharge 35 moves in the direction of the first arrow 39. The smaller overflow volume 55 contained in part of volumetric portion 45 is discharged by a rotation opposite to the first arrow 39. The larger exact volume 52 is achieved by filling the 3 volumetric portions 42, 43 and 45 to achieve the top surface 50. The second top surface 50 is essentially that in a single exact volume container (FIGS. 2A–2D) having again the weir 24 and the diaphragm 22 to achieve the exact volume 52. The overflow volume 54 is again retained in the second volumetric portion 44. The first volumetric portion becomes the sum of the three smaller volumetric portions 42, 43 and 45. The larger exact volume 52 is discharged by lifting and rotating the container 20 such that second point of discharge 33 moves in the direction of the second arrow 37. The overflow volume 54 contained in volumetric portion 44 is discharged by a rotation opposite to the second arrow 37.

A unique arrangement of the relative position of the two diaphragms 22, 23 of FIGS. 3A and 3B allows the exact volumes 52 or 53 to be discharged without discharging overflow volumes 54 and 55 respectively. That is, volumetric portion 45 is full of the fluent material when obtaining the exact volume 52. The second discharge point 33 allows the fluent material in second volumetric portion 45 to be totally discharged as a part of exact volume 52.

Figure 4A:
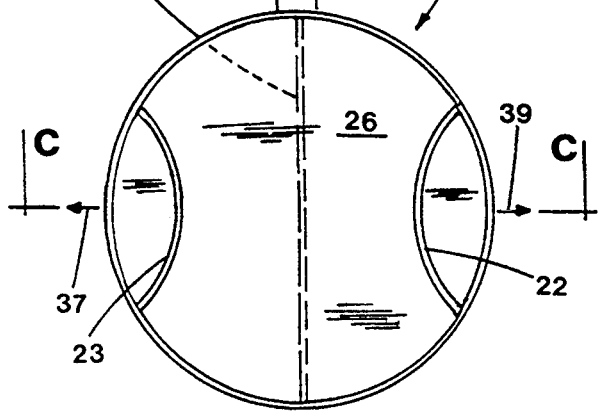
FIG. 4A is a top view of an alternate embodiment of the two exact volume container of this invention for use as a household measuring device.
Figure 4B:
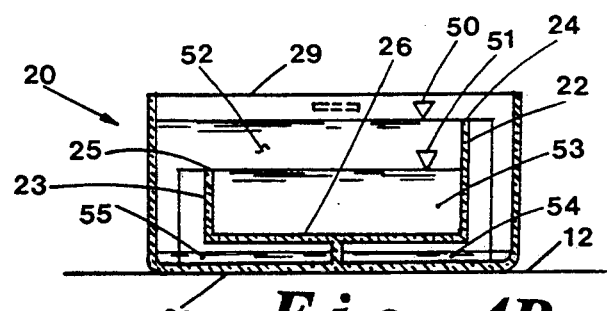
FIG. 4B is a sectional elevation view of the device of FIG. 4A cut along the line C—C.
Figure 4C:
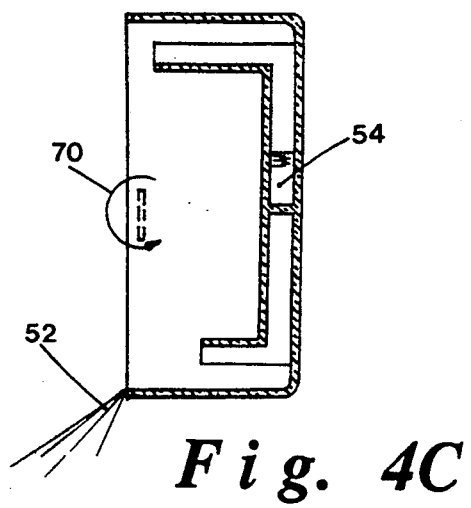
FIG. 4C is the sectional elevation view of FIG. 4B illustrating an exact volume being discharged while containing the overflow volume.

A further embodiment of the ability to measure two exact volumes of a fluent material within a single container 20 or vessel is illustrated in FIGS. 4A, 4B and 4C. All essential components of a two exact volume container of FIGS. 3A and 3B are again illustrated. The container of FIGS. 4A, 4B and 4C discloses how the scope of this invention includes a simple household measuring device. The diaphragms 22 and 23 have a common bottom surface 26 and a divider 27. A handle 211 is included for lifting and rotating the container 20 by hand. A rotation indicated by curved arrow 70 illustrates (in FIG. 4C) the position of the container to discharge exact volume 52 by moving the top edge 29 in the direction shown by arrow 37 in FIG. 4A. The smaller exact volume 53 is discharged by the opposite movement of the top edge 29 in the direction indicated by arrow 39. In the discharging of the fluent material from the smaller exact volume 53, the fluent material passes over the weir 24, but the overflow volume 55 is once again contained by the bottom surface 26 and the divider 27.

The configuration of the weir 24 or 25 is not critical in this invention. The weir may be at any location along the free edge of the diaphragm 22 or 23. The critical feature of the weir is to accurately establish the top surface 50 or 51. Many weir designs which do this are know in the art for various fluent materials, including a notch weir or a slit.

Figure 5B:
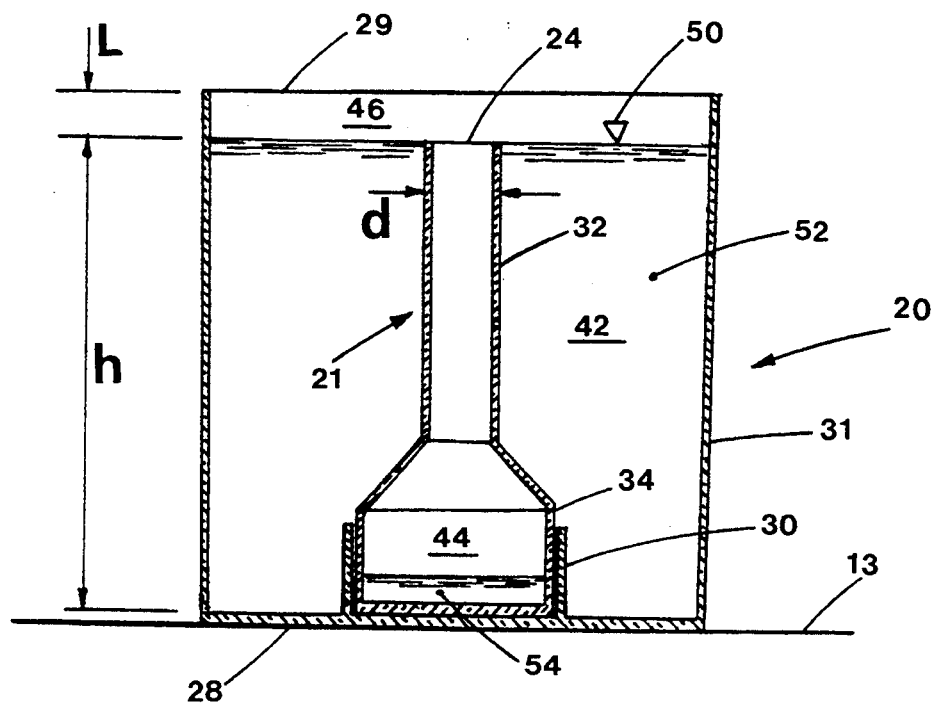
FIG. 5B is a sectional elevation view of the container of FIG. 5A cut along the line D—D.
Figure 5A:
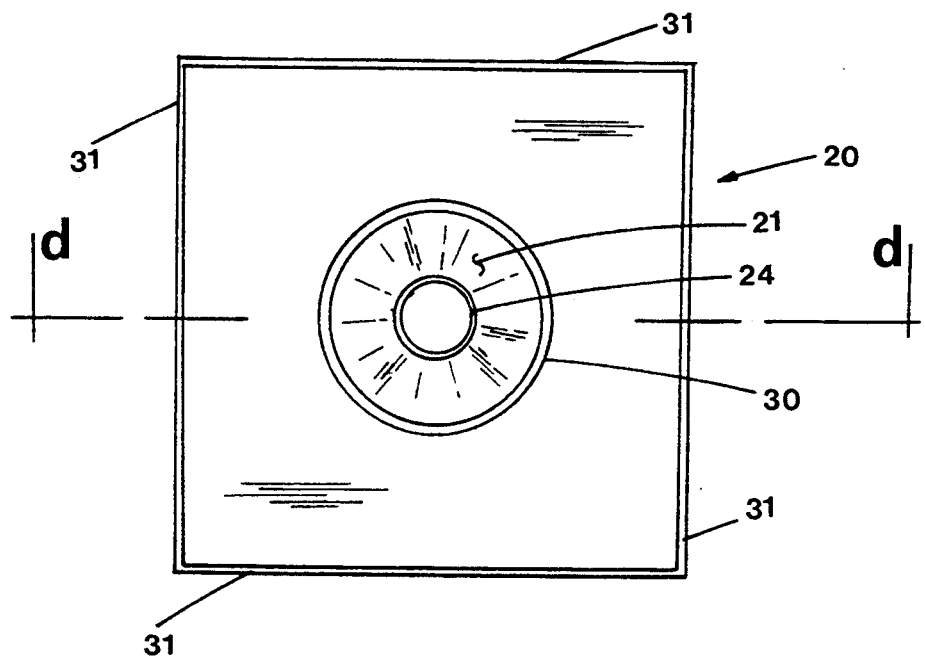
FIG. 5A is a top view of the container of this invention illustrating and embodiment wherein the second coexisting volumetric portion is within a removable portion being replaceable; for adjusting the height of the weir.

Another embodiment of this invention is illustrated in FIGS. 5A and 5B. It is within the scope of this invention to provide a removable portion 21, that comprises the weir 24 and an interior volume essentially equal to the second volumetric portion 44, that receives and contains the overflow volume 54. The removable portion 21 is essentially cylindrical in shape and is contained in and coexists with the first volumetric portion 52, and extends to a height H above the base 28 of the container 20. The height H determines the exact volume 52 and varies the safety volume 46 and height L of the safety lip. A base collar 30 is attached to the base 28 of the container 20 to receive and hold the removable portion 21. A number of removable portions 21 of various heights H can be used to yield different exact volumes 52.

The shape of sides 31 of the container 20 is not an important feature for the device of FIGS. 5A & 5B. That is, the cylindrical shape of a neck portion 32 of the removable portion 21 is made with a small diameter D. Therefore, the supporting surface 13 does not need to be horizontal for obtaining a relatively accurate exact volume 52, as well as the container shape can be modified. A cylindrical base 34 of the removable portion 21 permits the exact volume 52 to be discharged from the container 20 by rotation of the container 20 in any direction without discharging the overflow volume 54. The weir 24 is contained on the circular top edge of the neck portion 32.

Figure 6A:
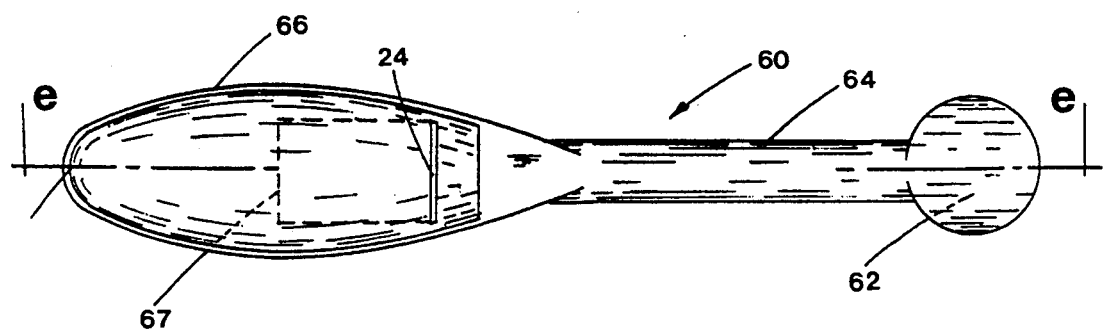
FIG. 6A is a top view of a spoon within the scope of this invention for obtaining an exact volume for dispensing.
Figure 6B:
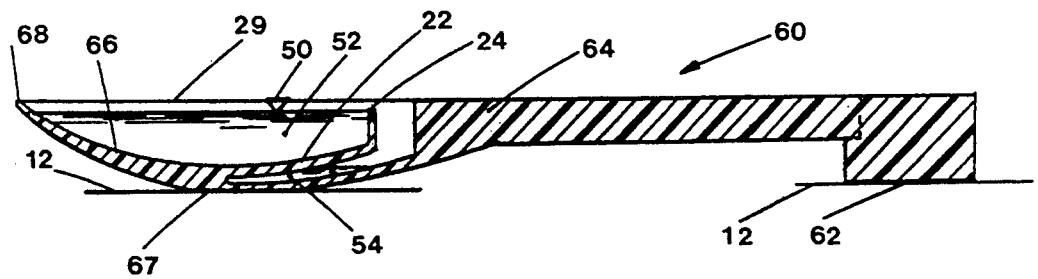
FIG. 6B is a sectional elevation view of the spoon of FIG. 6A cut along line E—E.

The measuring spoon 60 illustrated in FIGS. 6A and 6B, provides another useful application of the invention. The spoon 60 is supported on a horizontal surface 12 and contacts the surface at the end support 62 of the handle 64, as well as the flat spot 67 of the spoon container 66. The diaphragm 22 with the weir 24 is positioned so that the exact volume 52 has a top surface 50 below the top edge 29 of the spoon container 66. The overflow volume 54 is contained below the diaphragm 22. A rotation of the spoon counter-clockwise as viewed in FIG. 6B, after lifting the spoon, will control the fluent material so that the exact volume 52 is discharged at the end point 68.

Figure 7A:
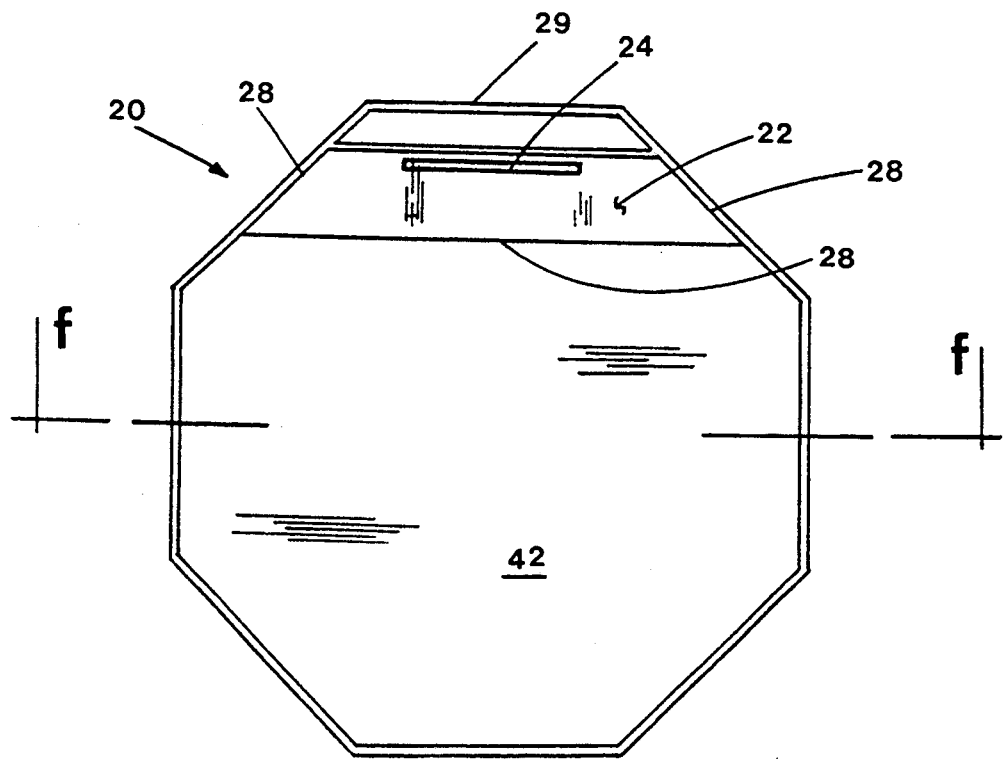
FIG. 7A is a top view of yet another container of this invention having a diaphragm with a weir aperature or slot containing said weir.
Figure 7B:
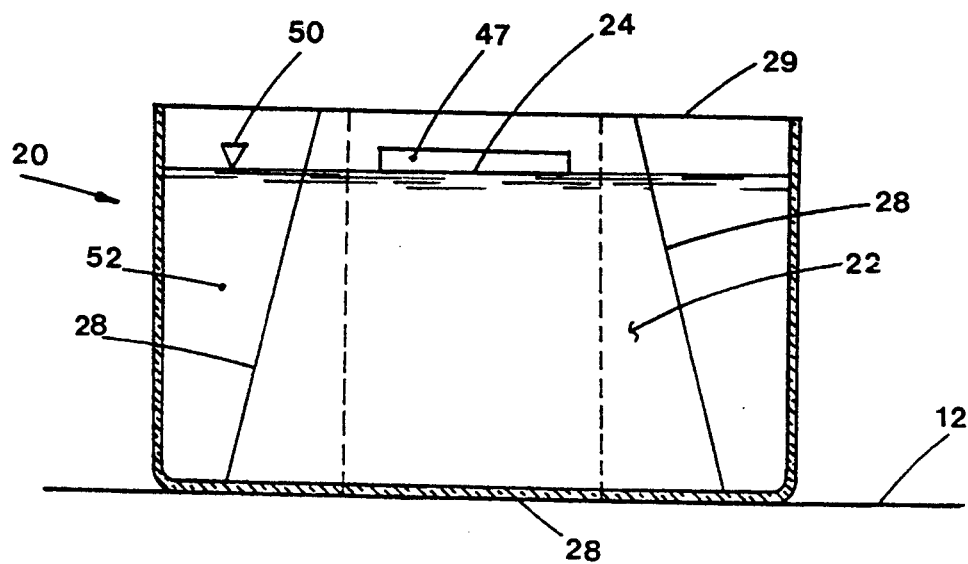
FIG. 7B is a sectional view of the container of FIG. 7A cut along the line F—F.

The weir 24 is positioned at the top edge of the diaphragm 22 that separates the first and second volumetric portions of the container 20 as illustrated in FIGS. 2–6. It is within the scope of this invention to form a weir 24 by providing a weir aperture 47 in a diaphragm 22 that extends above the elevation of the weir. A weir aperture 47 in the form of a slot is illustrated in the container 20 of FIGS. 7A and 7B. The weir 24 once again controls a top surface 50 of the exact volume of the fluent material. It's placement in height above the base 28 determines the exact volume. Also within the scope of this invention, the diaphragm 22 can be a removable part. The interfaces 28 of the diaphragm 22 with the sides 31 of the container 20 may be such that one diaphragm can be removed and replaced with another diaphragm having a weir aperture positioned at another location above the base 28. The interfaces 28 must be such that the fluent material will not pass from one volumetric portion to the other volumetric portion.

The accuracy of measuring an exact volume is anticipated to be within 0.1 percent of the desired predetermined value. The various physical properties of the fluent material as well as volumetric changes in the container due to temperature, humidity and atmospheric pressure can be used to obtain an exact volume. Surface conditions of the fluent material including surface tension, wetting of the container surfaces and contact with the weir are important in repeatability of the exact volume measurements. Granular materials capable of achieving a flat top surface by vibrating the container are also within the scope of the fluent materials included in this invention.

It is within the scope of this invention to make other modifications, changes and adaptations without departing from the spirit of the appended claims. While the subject matter has been described in terms of a few preferred embodiments, it is contemplated that persons reading those descriptions and studying the drawings will realize various alterations, permutations and variations.

What is claimed is:

1. An improvement in a single container for safely measuring at least one exact volume of a fluent material including:
    at least one first volumetric portion for receiving and containing up to an exact predetermined volume of said fluent material when a base portion of the container is supported approximately horizontally and when said first volumetric portion is filled with said material;
    at least one overflow weir to limit the elevation of a top surface of the material in each respective first volumetric portion to achieve a respective exact volume of said material;
    at least one safety lip extending above the elevation of both a respective top surface and a respective weir to contain said material within said container; and
    a second volumetric portion to coexist with each respective first volumetric portion in said container which receives and contains any overflow volume from the respective weir after the respective first volumetric portion has been filled to the elevation of said respective top surface, wherein said respective exact volume of said material can be discharged by lifting and rotating said container in a respective first direction by one of a hand and an apparatus, wherein the improvement comprises:
    each of the first volumetric portions being separated from a respective second volumetric portion by a respective thin planar diaphragm, wherein said diaphragm is characterized by an angular orientation with respect to said single container, said angular orientation being such that the overflow volume is retained by said diaphragm when discharging said exact volume, wherein said diaphragm separates the exact volume from the overflow volume and said diaphragm includes said weir to accurately obtain said exact volume.

2. The container set forth in claim 1, wherein said exact volume of the fluent material is measured within 0.1 percent of a calculated predetermined volume of said first volumetric portion.

3. The container set forth in claim 1, wherein a ratio of a maximum volume within the second volumetric portion to the exact volume within the respective first volumetric portion is less than 0.20.

4. The container set forth in claim 1, wherein the overflow volume can be discharged from within the second volumetric portion of the container by rotating the container in a second direction different than the first direction of rotation.

5. The container set forth in claim 1, wherein there are two first volumetric portions and two respective second volumetric portions, wherein two different exact volumes can be measured and discharged using said single container.

6. The container set forth in claim 5, wherein there exists a preferred rotational direction for discharging each of the exact volumes from the respective first volumetric portions and a direction opposite each said preferred rotational direction for discharging each of the overflow volumes from the respective second volumetric portions.

7. A single container for safely measuring at least one exact volume of a fluent material comprising:
    a single first volumetric portion for receiving and containing up to an exact predetermined volume of said material when a base portion of the container is supported approximately horizontally and when said first volumetric portion is filled with said material;
    a single overflow weir to limit the elevation of a top surface of the material to achieve the exact volume of said material;
    a safety lip extending above the elevation of both the top surface and the weir to contain said material within said container;
    a single second volumetric portion to coexist with the first volumetric portion in said container which receives and contains any overflow volume from the weir after the first volumetric portion has been filled to the elevation of said top surface, wherein the exact volume and the overflow volume of the material can be maintained as separate volumes by a single thin diaphragm portion which contains the overflow weir at its top edge; and
    a base collar to receive and hold a removable portion within said container, said removable portion having a cylindrically shaped neck portion and a closed bottom portion defining said diaphragm positioned symmetrically within the container and to receive and hold said overflow volume, wherein said overflow weir is defined as a top edge of the neck portion and being positioned a predetermined elevation above the base portion of the container to define said first volumetric portion, whereby said exact volume of said material is discharged by lifting and rotating said container in a first direction by one of a hand and an apparatus while at the same time maintaining the overflow volume of the material safely within said removable portion and whereby said overflow volume of said material may be discharged by lifting and rotating said removable portion after said exact volume has been discharged.

8. A method for safely and quickly measuring and dispensing an exact volume of a fluent material using a single container having a weir including the steps of:
    a) providing a removable portion including said weir at a top, said removable portion having a cylindrically shaped neck portion and a closed bottom portion, said removable portion being supported by a collar within the container and symmetrically positioned to be surrounded by a first volumetric portion;
    b) locating said weir above a bottom portion of said container a predetermined distance, wherein said first volumetric portion is defined within the container by said distance of said weir of said removable portion;
    c) filling said first volumetric portion of said container with said fluent material, said container having its bottom portion approximately horizontally supported by a surface;
    d) continuing to fill the first volumetric portion so that a top surface of the material is approximately at said predetermined distance of said weir;
    e) overflowing the material such that a relatively small overflow volume of the material passes over the weir into a second volumetric portion within said removable portion, wherein said first volumetric portion contains an exact volume of said material and said top surface is at an elevation below a top edge of a safety lip of said container;

f) lifting and rotating the container in a first direction to discharge the exact volume from the container;

g) continuing to rotate the container in said first direction to a position where the exact volume is totally discharged while the overflow volume remains safely within the second volumetric portion of the removable portion.

9. The method set forth in claim 8, wherein further steps include removing said removable portion from said container and rotating said removable portion to discharge the overflow volume from the removable portion, whereby the overflow volulme is concerved by returning it to a source of the fluent material.

* * * * *